United States Patent Office 3,829,309
Patented Aug. 13, 1974

---

3,829,309
PROCESS FOR SMELTING ILMENITE TO PRODUCE PIG IRON AND TITANIA-CONTAINING SLAG
John M. Gomes, Reno, Nev. and Kenji Uchida, Tokyo, Japan, assignors to The United States of America as represented by the Secretary of the Interior
Filed June 6, 1972, Ser. No. 260,262
Int. Cl. C01g 23/04
U.S. Cl. 75—1   15 Claims

ABSTRACT OF THE DISCLOSURE

The smelting of an ilmenite concentrate (61 weight percent $TiO_2$ and 37 weight percent FeO) with a sodium borate flux and a carbonaceous material, such as coal, as the reducing agent, is performed in a furnace at 1150° C. to 1200° C. to yield molten pig iron in marketable condition (95 to 97 weight percent iron) and slag containing 25 weight percent titania ($TiO_2$) and less than 1 weight percent FeO, with the slag containing 95 to 99 percent of the titanium. Two alternative procedures are thereafter followed, one a quenching-leaching and the other a leaching-calcination process, to yield a sodium titanate product containing 70 to 80 weight percent $TiO_2$, a product which can readily be beneficiated to pigment grade $TiO_2$ by suitable treatment, such as by the well known "sulfate process."

---

The invention relates to improvements in the pyrometallurgical treatment of ilmenite ($FeTiO_3$) mineral concentrates for the recovery of both a marketable pig iron and a slag containing about 25 weight percent $TiO_2$, which can be followed by a hydrometallurgical processing of the slag so as to yield pigment grade $TiO_2$.

Ilmenite ores are a valuable natural resource in the United States since they are the only domestic source of titanium. Titanium, in turn, is an important structural material in aircraft and aerospace industries owing to the metal's unique properties of light weight and high strength at elevated temperatures. Titanium dioxide is also of importance in the paint industry, serving as an excellent white pigment. In 1968, 92 percent of the titanium consumed in the United States was utilized as titania pigment.

Heretofore, the pyrometallurgical treatment of ilmenite has involved smelting at temperature in excess of 1400° C., using fluxes such as limestone, magnesia, soda ash, silica, lime and sodium oxide.

An example of a pyrometallurgical treatment is the technique presently used by a major smelter in Canada. The treatment involves the smelting of ilmenite and coal at 1600° C. to 1800° C. in an electric arc furnace to produce pig iron and a slag containing 70 weight percent $TiO_2$ and 10 weight percent FeO. From 25 to 35 percent of the titanium is in the trivalent state, requiring an intermediate oxidation step to make it soluble in sulfuric acid. The slag is thereafter treated by sulfuric acid digestion to recover $TiO_2$. In summary, about 90 percent of the titanium is recovered in the slag and 80 percent of the iron is recovered in a refined product containing 98.5 percent iron. This smelting process involves moderately high smelting temperatures and the yield leaves something to be desired, since about 10 percent of the titanium is not recovered.

Another commercial method for preparing $TiO_2$ from ilmenite is the "sulfate process" involving the steps of decomposing the ilmenite in sulfuric acid, removing the iron from solution, hydrolytically precipitating metatitanic acid from the sulfate solution and igniting the precipitate to recover titanium dioxide. This acid digestion process creates a pollution problem since the by-product (ferrous sulfate (copperas)) has little value and is usually discarded. For example, approximately 1.1 million tons of copperas ($FeSO_4.7H_2O$) and monohydrate ($FeSO_4.H_2O$) are generated annually in the treatment of ilmenite by the sulfate process (1970 edition, U.S. Bureau of Mines Bulletin, pages 773–794). Only 200,000 tons of the ferrous sulfates were sold in 1968. The remaining 900,000 tons were discarded on land and into streams and the ocean, thereby constituting a major waste disposal problem.

It is therefore an object of the invention to provide a process for the treatment of ilmenite which provides a relatively high yield of commercially marketable pig iron and titania-containing slag.

It is another object of the invention to provide a process for the treatment of ilmenite which is relatively inexpensive and which minimizes the problem of waste disposal.

It is a further object of the invention to provide a process for the treatment of ilmenite which smelts the ore at a relatively low temperature, thereby permitting the use of alkali metal compounds for fluxes, thus obtaining the advantage of forming alkali metal titanates which are readily soluble in dilute mineral acids.

It is yet a further object of the invention to provide a process for the treament of ilmenite in which the smelting can be a batch or continuous operation, depending on the type of furnace utilized; in which carbonaceous materials other than coal, such as wood chips, bark, charcoal and coke, may be used as the reducing agent in the furnace charge; and, in which other alkali borates can be substituted for all or part of the sodium borate flux.

It is still a further object of the invention to provide a process for the treatment of ilmenite in which the sodium borates can be recovered from the water solution by crystallization methods based upon their differences in solubility in hot and cold solutions.

It is another object of the invention to provide a genenerally improved method of treating ilmenite.

Other objects, together with the foregoing, are attained in the procedures described in the following description and illustrated in the accompanying drawings in which.

Figure 1:
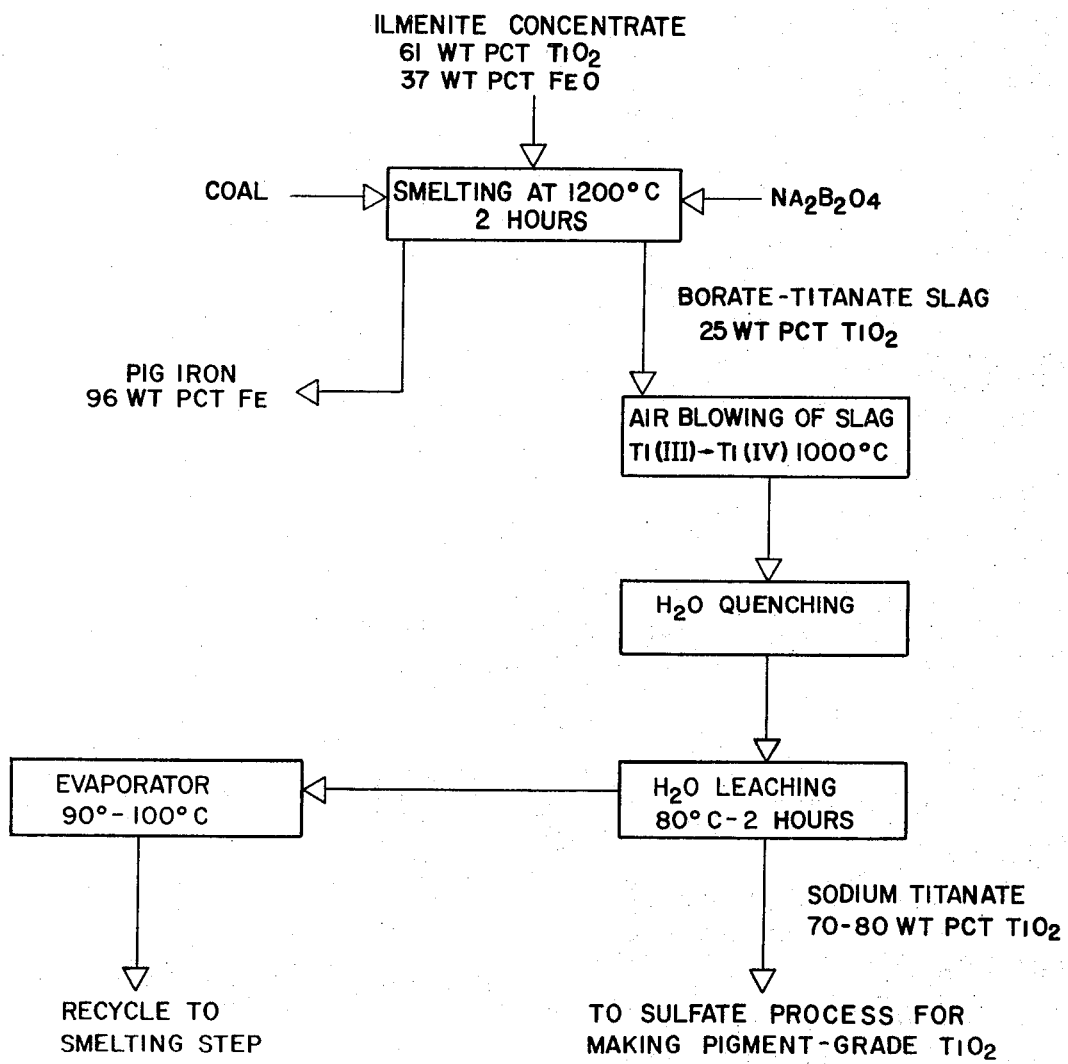
FIG. 1 is a flow diagram of the smelting-quenching-leaching method.
Figure 2:
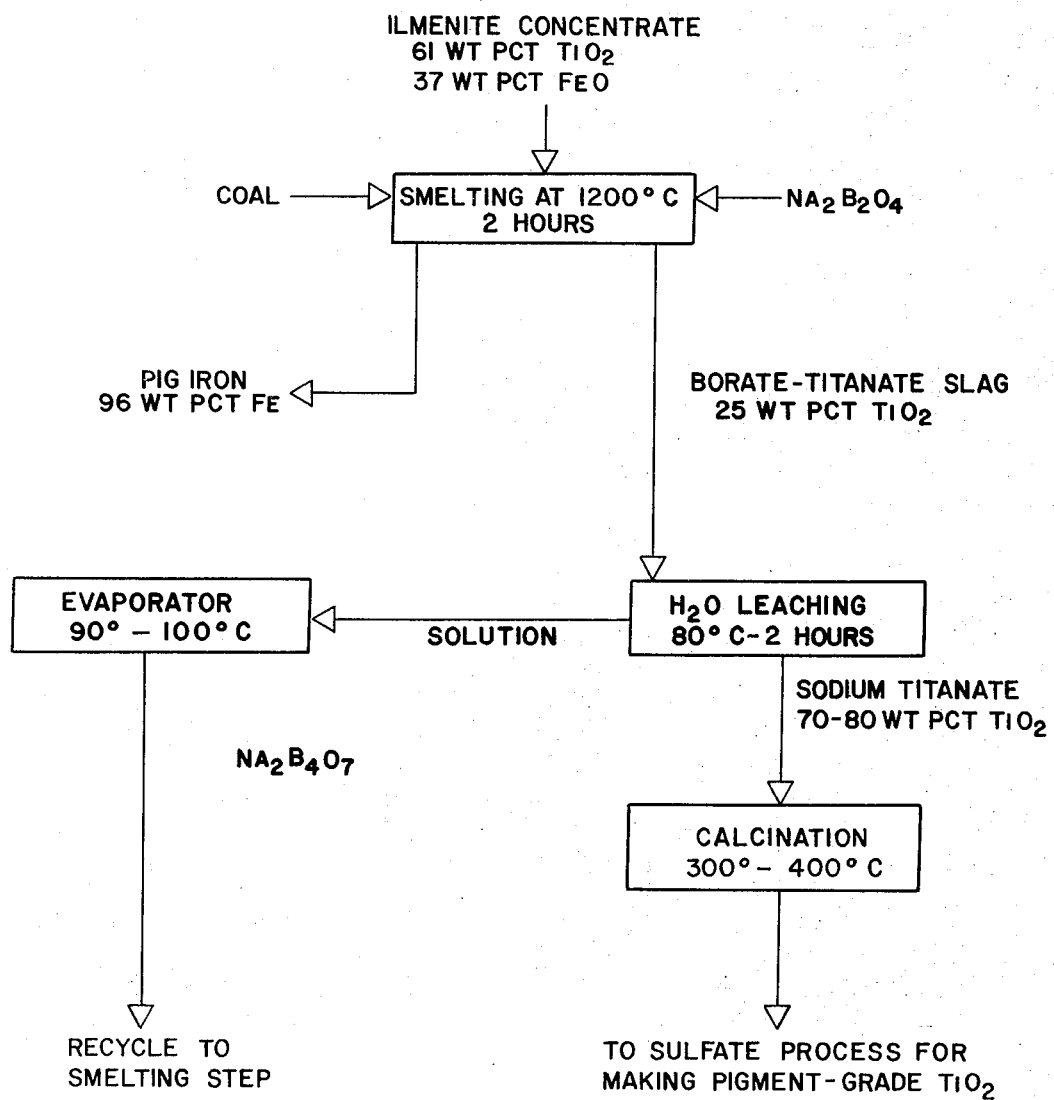
FIG. 2 is a flow diagram of the smelting-leaching-calcination method.

In both FIG. 1 and FIG. 2, it can be seen that in the first step, ilmenite concentrate (containing, for example, 61 weight percent $TiO_2$ and 37 weight percent FeO) is smelted for 2 hours in a furnace at 1200° C., coal being used as a reducing agent and sodium borate ($Na_2B_2O_4$) as a flux. The molten slag and pig iron are thereupon separated, as shown, by pouring each into separate molds or separating after solidification.

The smelting of ilmenite is represented by the following equation:

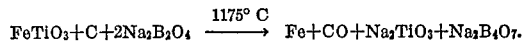

$$FeTiO_3 + C + 2Na_2B_2O_4 \xrightarrow{1175°\ C} Fe + CO + Na_2TiO_3 + Na_2B_4O_7.$$

About 90 percent of the iron in the ilmenite is recovered as pig iron, the pig iron in the mold being a marketable product containing 95 to 97 weigth percent iron (as indicated in FIGS. 1 and 2), 3 to 4 weight percent carbon and trace quantities of boron, silicon and titanium.

Approximately 99 percent of the $TiO_2$ in the ilmenite is recovered in the borate-titanate slag, the slag containing about 25 weight percent $TiO_2$ and 0.5 to 1.0 weight percent FeO.

The slag is thereafter treated by either of two methods to obtain a sodium titanate product containing 70 to 80 weight percent $TiO_2$.

In the Smelting-Quenching-Leaching procedure shown in FIG. 1, oxygen or air is first blown through the molten slag for 5 to 15 minutes, at a temperature of approximately 1000° C. This procedure oxidizes the approximately 20 percent of the titanium in the slag in the trivalent state and converts it to the tetravalent state.

The molten slag at 950° C. to 1000° C. is thereupon quenched by pouring it into a water bath. This step not only granulates the slag but also heats the water so that the sodium borates start to dissolve. Quenching the slag results in a desirable, granular, non-crystalline type of product devoid of any acid-insoluble crystalline rutile ($TiO_2$).

The granulated slag in the water bath is next agitated for two hours while being kept heated to 80° C. to 90° C. to complete dissolution of the borates.

Thereafter, the granular, non-crystalline sodium titanate residue containing 70-80 weight percent $TiO_2$ is recovered by filtration while sodium borate is recovered from the solution by evaporation at 90-100° C. and recycled back to the smelting operation, soda ash ($Na_2CO_3$) being added to the recovered borate to replace the $Na_2O$ that reacted with the $TiO_2$ to form sodium titanate.

In the Smelting-Leaching-Calcination procedure illustrated in FIG. 2, the slag is first allowed to cool somewhat and is then crushed to minus 35 mesh, being thereafter leached in water at 80° C. to 90° C. for 2 hours to dissolve the sodium borates. The water leaching step upgrades the slag from 25 weight percent to 70-80 weight percent $TiO_2$. After leaching, the sodium titanate residue containing 70-80 weight percent $TiO_2$ is recovered, as before, by filtration, while the sodium borate is recovered from the filtrate by evaporation and returned to the smelting operation.

The dried sodium titanate is thereupon subjected to calcining at 300° C. to 400° C. to oxidize the trivalent titanium to the acid-soluble tetravalent state.

In both procedures, the sodium titanate residue contains a mixture of $Na_2TiO_3$, $Na_2TiO_5$, $Na_2TiO_7$ and $Na_2Ti_2O_4$ (amounting to a total of 70 to 80 weight percent $TiO_2$) which can thereafter be upgraded to pigment grade $TiO_2$ by any suitable process such as the well-known "sulfate process" or the "chloride process."

It is of interest to note that the uniquely advantageous low temperature smelting of iron characterizing the process disclosed herein is theoretically based on the formation of an iron-carbon (4.5 weight percent) alloy that melts at 1153° C. The presence of small quantities of other constituents, such as boron, silicon and titanium decreases the melting point of the alloy below 1150° C.

By effecting reduction of the iron at relatively low temperatures, e.g. 1200° C. or less, sodium compounds can advantageously be used for fluxes, whereas at temperatures above 1200° C., considerable sodium borate is lost by fuming because of its high vapor pressure. The advantage of using an alkali metal compound is the formation of alkali metal titanates which are readily soluble in dilute mineral acids. The slag is a mixture of sodium borate and sodium titanate. The borates and titanates are easily separated by hot water leaching since the borates are very soluble and the titanates are insoluble in water.

The foregoing characteristics are used to advantage as will more clearly appear in the following detailed descriptions of the procedures indicated in the accompanying FIGS. 1 and 2.

SMELTING-QUENCHING-LEACHING PROCESS
(FIG. 1)

The following description describes the results obtained from using the smelting-quenching-leaching technique of FIG. 1.

EXAMPLE 1.—FURNACE CHARGE

| Material | Size | Weight in grams |
|---|---|---|
| Ilmenite | 100 percent minus 65 mesh | 304 |
| FeO | 37 weight percent | |
| $TiO_2$ | 61 weight percent | |
| Coal | 100 percent minus 20 plus 65 mesh. | 40 |
| $Na_2B_2O_4$ (technical grade) | Granular | 404 |
| $Na_2B_4O_7$ (technical grade) | do | 88 |

The furnace charge materials were well mixed and the charge introduced into a hot graphite crucible (3 inches I.D. by 7 inches deep) in a pot furnace. Smelting proceeded for two hours at 1,175°–1,200° C., at which time the slag and pig iron were separated and weighed. Separation is readily effected owing to the difference in specific gravities of the two substances.

Four separate charges were thus smelted.

Thereafter, in each case, the slag in molten condition (950°–1,000° C.) was oxygen-blown for six minutes, the oxygen being introduced into the slag through a silicon nitride lance, with the oxygen flow regulated to afford a smooth reaction. The air blowing resulted in the oxidation of the approximately 20 percent of the titanium in the slag in the trivalent state, thereby converting it to the tetravalent state.

The molten slag was then quenched in a bucket containing two gallons of water, the slags from the four charges being poured into the same two gallons of water.

The bucket, containing the two gallons of water plus the four charges of slag, was then placed on a hot plate and the solution heated to 80° C. and agitated for two hours.

The slurry was then filtered to separate the insoluble sodium titanate from the borate-containing solution, the latter being thereafter evaporated to recover the sodium borates for recycling.

The results and analyses of the products are shown in the following Example 2.

Example 2.—Results from Smelting-Quenching-Leaching Procedure Total materials in four smelting charges

|  | G. |
|---|---|
| Ilmenite | 1,216 |
| Coal | 160 |
| $Na_2B_2O_4$ | 1,616 |
| $Na_2B_4O_7$ | 352 |
| Total | 3,344 |
| Pig iron recovered (96% Fe) _____ g__ | 334 |
| Iron recovered as pig iron _____ percent__ | 92 |
| Borate-titanate slag _____ g__ | 2,647 |
| $TiO_2$ content of borate-titanate slag ____ wt. pct__ | 26.0 |
| Sodium titanate recovered _____ g__ | 980 |
| $TiO_2$ content of sodium titanate _____ wt. pct__ | 67.5 |
| $TiO_2$ recovered as titanate _____ wt. pct__ | 97.5 |
| FeO content of titanate _____ wt. pct__ | 2.0 |
| $Ti^3$ content of titanate _____ wt. pct__ | 0.15 |
| $Ti^3$ content of borate-titanate slag _____ wt. pct__ | 2.16 |
| Sodium borate recovered by evaporation ____ g__ | 1,661 |

Analysis of sodium borate in weight percent: Na, 31.6; B, 17.6; O, 50.7.

X-ray diffraction analysis: strong $Na_2B_2O_4$

Spectrographic analyses of the pig iron, sodium titanate and sodium borate are given, as follows, in Table 1.:

TABLE 1.—SPECTROGRAPHIC ANALYSES OF PRODUCTS, IN PARTS PER MILLION

| | Al | B | Ca | Cr | Fe | Mg | Mn | Si | Ti |
|---|---|---|---|---|---|---|---|---|---|
| Pig iron | 50 | 1,000 | | 1,000 | (a) | 100 | 800 | 200 | 600 |
| Sodium titanate | 300 | 300 | 800 | 200 | 20,000 | 2,000 | 2,000 | 10,000 | (a) |
| Sodium borate | 20 | (a) | 200 | | 40 | 60 | 60 | 300 | 300 | a Indicates major constituent.

SMELTING-LEACHING-CALCINATION PROCESS (FIG. 2)

The following description describes the procedures followed and results obtained from a six-cycle experiment for the treatment of ilmenite by the smelting-leaching-calcination technique of FIG. 2. The composition of the furnace charge, smelting time and temperature, as well as operating variables in leaching, may be changed to yield even more efficient results.

EXAMPLE 3.—FURNACE CHARGE

| Material | Size | Weight in grams |
|---|---|---|
| Ilmenite | 100 percent minus 65 mesh | 76 |
| FeO | 37 weight percent | |
| $TiO_2$ | 61 weight percent | |
| Coal | 100 percent minus 20 plus 65 mesh. | 10 |
| $Na_2B_2O_4$ (technical grade) | Granular | 10 |
| $Na_2B_4O_7$ (technical grade) | do | 21 |

The furnace charge materials were well mixed and the charge was added to a hot graphite crucible (3 inches I.D. by 7 inches deep) in a pot furnace. Smelting was carried out at 1,175°–1,200° C. for two hours, after which the molten charge was poured into a conical mold. After solidification, the slag and pig iron were separated and weighed, the difference in specific gravities facilitating the separation.

This cycle was repeated six times, using the same Furnace Charge as shown in Example 3. The weights of the resulting pig iron and slag products, along with the $TiO_2$ and FeO contents of the slag, are given, as follows, in Example 4.

EXAMPLE 4.—PRODUCTS OBTAINED FROM SMELTING ILMENITE CONCENTRATE

| | Pig iron wt., grams | Slag Weight, gms. | $TiO_2$ content, wt. percent | FeO content, wt. percent |
|---|---|---|---|---|
| Cycle number: | | | | |
| 1 | 19.7 | 161 | 28.0 | 0.33 |
| 2 | 20.1 | 169 | 27.0 | .93 |
| 3 | 20.1 | 173 | 27.9 | .76 |
| 4 | 20.9 | 178 | 27.3 | .72 |
| 5 | 19.7 | 170 | 26.6 | .78 |
| 6 | 19.9 | 172 | 26.6 | .70 |
| Total | 120.8 | 1,023 | | |

In connection with the above Example 4, it is to be noted that the pig iron contains 3.8 to 4.2 weight percent C and 0.02 to 0.04 weight percent O; and that 99 percent of the $TiO_2$ is recovered in the slag.

Spectrographic analyses of the slag and pig iron products are given, as follows, in Table 2.

TABLE 2.—SPECTROGRAPHIC ANALYSES OF SLAG AND PIG IRON PRODUCTS

| | Product | |
|---|---|---|
| | Pig iron | Slag |
| Elements, parts per million: | | |
| Al | <50 | 1,000 |
| B | 1,000 | (a) |
| Co | 200 | <10 |
| Cr | 800 | 50 |
| Cu | 200 | <5 |
| Fe | (a) | 5,000 |
| Mn | 800 | 6,000 |
| Mo | 30 | <10 |
| Nb | 100 | 10 |
| Ni | 50 | <10 |
| Si | <20 | 2,000 |
| Ti | 50 | (a) |
| V | 500 | 20 | a Indicates major constituent.

The slags recovered from the foregoing six-cycle experiment were composited into two batches: No. 1 (cycles 1, 2 and 3) and No. 2 (cycles 4, 5 and 6) and ground to minus 35 mesh.

A 450-gram sample from each batch was leached in 900 ml. of water for 3 hours at 80°–90° C. The two leach residues were submitted for chemical analysis and the two leach solutions were evaporated to yield evaporation residues weighing 317 grams and 380 grams, respectively.

The weights and analyses of the two batches of leach residues are set forth as follows in Example 5.

EXAMPLE 5.—LEACH RESIDUES

| | Product | Weight, grams | Oxide content, wt. percent | | | |
|---|---|---|---|---|---|---|
| | | | $TiO_2$ | FeO | $Na_2O$ | $SiO_2$ |
| Batch No.: | | | | | | |
| 1 | Leach residue | 175 | 64.7 | 1.5 | 13.5 | 3.2 |
| 2 | do | 147 | 77.5 | 2.1 | 9.9 | 3.4 |

The above-mentioned evaporation residues from Batches 1 and 2, weighing 317 grams and 380 grams, respectively, were heated to 500° C., and after heating, weighed 270 grams and 300 grams, respectively.

The 270 gram residue from Batch 1 contained 54 weight percent $B_2O_3$ and 41 weight percent $Na_2O$. An X-ray diffraction pattern showed major $Na_2B_2O_4$.

Spectrographic analysis of the leach residue and the evaporation residue are given, as follows, in Table 3.

TABLE 3.—SPECTROGRAPHIC ANALYSES

| | Leach residue | Evaporation residue (after heating to 500° C.) |
|---|---|---|
| Element, p.p.m.: | | |
| Al | 5,000 | 3,000 |
| B | 7,000 | (a) |
| Fe | 8,000 | 40 |
| Mg | 3,000 | 60 |
| Mn | 6,000 | 30 |
| Si | 1,000 | 100 |
| Ti | (a) | 100 | a Indicates major constituent.

The anhydrous borate evaporation product was then used in smelting an additional 76 grams of ilmenite (the same amount as in the furnace charge composition indicated in Example 3) using the same technique as previously set forth. A 21-gram iron button was obtained, representing a recovery of 94 percent of the iron. This yield is comparable to that initially obtained, thereby indicating the feasibility of recycling the evaporation residue.

As previously noted, the product resulting from both of the foregoing procedures can be beneficiated to pigment grade $TiO_2$ by suitable treatment, such as by the well-known "sulfate process" wherein the product is treated by sulfuric acid digestion followed by precipitation of metatitanic acid from the sulfate solution and ignition of the precipitate to $TiO_2$.

By altering the smelting charge in the manner now to be described, the resulting material might be used as a rutile substitute for the preparation of $TiO_2$ by the "chloride process" which requires a high grade feed material for best results.

In this connection, it is of interest to note that while the United States is self sufficient in ilmenite, it depends upon foreign sources for rutile ($TiO_2$). The chloride process for making titania pigment was commercially developed in 1958. Rutile is chlorinated to form $TiCl_4$ which is reoxidized to form pigment grade $TiO_2$. While ilmenite can be used in the process, the iron and other impurities are chlorinated, causing excessive chlorine consumption as well as the problem of $FeCl_3$ waste disposal.

EXAMPLE 6.—FURNACE CHARGE

| Material | Size | Weight in grams |
|---|---|---|
| Ilmenite | 100 percent minus 65 mesh | 304 |
| FeO | 37 weight percent | |
| $TiO_2$ | 61 weight percent | |
| Coal | 100 percent minus 20 plus 65 mesh. | 24 |
| $Na_2B_2O_4$ (technical grade) | Granular | 200 |
| $Na_2B_4O_7$ (technical grade) | do | 40 |

This charge was smelted as before and resulted in a borate-titanate slag containing 46.2 weight percent $TiO_2$ and 0.33 weight percent iron. After water leaching, the titanate fraction contained 90 weight percent $TiO_2$ and 0.71 weight percent iron. This material is sufficiently high grade to be used as a rutile substitute for the preparation of $TiO_2$ by the chloride process.

Although not productive of a yield having the high percentage of the immediately preceding example, it is of importance to note that the process of our invention is capable of providing a product which is susceptible of treatment by the sulfate process even though the grade of ilmenite ore is relatively low, as shown in the following example.

EXAMPLE 7.—FURNACE CHARGE

| Material | Size | Weight in grams |
|---|---|---|
| Ilmenite | 100 percent minus 76 mesh | 304 |
| FeO | 41 weight percent | |
| $TiO_2$ | 45 weight percent | |
| Coal | 100 percent minus 20 plus 65 mesh. | 30 |
| $Na_2B_2O_4$ (technical grade) | Granular | 200 |
| $Na_2B_4O_7$ (technical grade) | do | 30 |

The borate-titanate slag resulting from the foregoing smelting operation contained 36 weight percent $TiO_2$ and 0.3 weight percent iron. After water leaching, the titanate fraction contained 79 weight percent $TiO_2$ and 0.45 weight percent iron, well within the range affording good recovery when further beneficiated pursuant to the sulfate process.

It can therefore be seen that the process for treating ilmenite as disclosed herein affords a considerable number of advantages over the prior art, such advantages including relatively low smelting temperatures, with the attendant benefits of lower cost and reduced energy consumption, relatively high product yield the ability to recycle some of the constituents and the substantial reduction of waste, thereby minimizing the problem of pollution.

What is claimed is:

1. A process for smelting ilmenite concentrate to produce pig iron and titania-containing slag comprising the steps of:
   a. smelting ilmenite concentrate in the presence of a carbonaceous material as a reducing agent and an alkali metal borate as a flux to form a liquified borate-titanate slag and pig iron, said borate-titanate slag comprising alkali metal titanates in an alkali metal borate matrix, said carbonaceous material being present in sufficient amount to reduce iron oxides contained in the ilmenite to said pig iron and said alkali metal borate being present in sufficient amount to react with substantially all of the titanium oxides contained in the ilmenite to form said alkali metal titanates and to form said liquified borate-titanate slag which liquefies at a temperature below 1200° C., and
   b. separating the resultant pig iron and borate-titanate slag.

2. A process as in claim 1 wherein smelting is effected in a furnace at a temperature of not over approximately 1200° C.

3. A process as in claim 2 wherein the carbonaceous material is coal and the alkali metal borate is sodium borate.

4. A process as in claim 3 wherein the ilmenite concentrate comprises approximately 61 weight percent $TiO_2$ and 37 weight percent FeO.

5. A process as in claim 1 including the further step of upgrading the slag to yield an alkali metal titanate comprising 70 to 80 weight percent $TiO_2$.

6. A process as in claim 5 including the additional step of upgrading the alkali metal titanate to pigment grade $TiO_2$.

7. A process as in claim 5 wherein said further step of upgrading comprises the step of air blowing the slag to convert the titanium content thereof from the trivalent to the tetravalent state, followed by the step of quenching the air blown slag in a water bath, followed by the step of separating the alkali metal titanate from the alkali metal borate.

8. A process as in claim 7 characterized by the additional step of recycling the alkali metal borate to the smelting operation.

9. A process as in claim 5 wherein said further step of upgrading comprises the step of leaching the slag in water to dissolve and separate the alkali metal borate from the alkali metal titanate.

10. A process as in claim 9 followed by the step of calcining the alkali metal titanate to convert the titanium content thereof from the trivalent to the tetravalent state.

11. A process as in claim 6 wherein said additional step of upgrading comprises subjecting the alkali metal titanate to the conventional "sulfate process" including the steps of digesting the alkali metal titanate in sulfuric acid, hydrolytically precipitating metatitanic acid from the sulfate solution, and calcining the precipitate to titanium dioxide.

12. A process for producing pigment grade titanium dioxide from ilmenite concentrate comprising the steps of:
   a. smelting ilmenite concentrate containing approximately 61 weight percent $TiO_2$ and 37 weight percent FeO in a furnace at approximately 1200° C. in the presence of a carbonaceous material as a reducing agent and sodium borate as a flux to form pig iron and a liquid borate-titanate slag, said borate-titanate slag comprising sodium titanates in a sodium borate matrix, said carbonaceous material being present in sufficient amount to reduce iron oxides contained in the ilmenite to said pig iron and said sodium borate being present in sufficient amount to react with substantially all of the titanium oxides contained in the ilmenite to form said sodium titanates and to form said liquid borate-titanate slag;
   b. separating the pig iron from the borate-titanate slag containing approximately 25 weight percent $TiO_2$;
   c. air blowing the liquid slag at approximately 1000° C. to convert Ti(III) to Ti(IV);
   d. quenching the air blown slag in water;
   e. leaching the slag in water at approximately 80° C.;
   f. separating the sodium titanate leach residue comprising approximately 70 to 80 weight percent $TiO_2$; and
   g. upgrading the leach residue to pigment grade $TiO_2$.

13. A process as in claim 12 further including recycling the sodium borate separated from the leach residue to the smelting step.

14. A process for producing pigment grade titanium dioxide from ilmenite concentrate comprising the steps of:
   a. smelting ilmenite concentrate containing approximately 61 weight percent $TiO_2$ and 37 weight percent FeO in a furnace at approximately 1200° C. in the presence of a carbonaceous material as a reducing agent and sodium borate as a flux to form pig iron and a liquid borate-titanate slag, said borate-titanate slag comprising sodium titanates in a sodium borate matrix, said carbonaceous material being present in sufficient amount to reduce iron oxides contained in the ilmenite to said pig iron and said sodium borate being present in sufficient amount to react with substantially all of the titanium oxides contained in the ilmenite to form said sodium titanates and to form said liquid borate-titanate slag;

b. separating the pig iron from the borate-titanate slag containing approximately 25 weight percent $TiO_2$;
c. leaching the slag in water at approximately 80° C.;
d. separating the sodium titanate leach residue comprising approximately 70 to 80 weight percent $TiO_2$;
e. calcining the leach residue at aprpoximately 300°–400° C.; and
f. upgrading the calcined residue to pigment grade $TiO_2$.

15. A process as in claim 14 further including recycling the sodium borate separated from the leach residue to the smelting step.

References Cited

UNITED STATES PATENTS

| | | | |
|---|---|---|---|
| 2,537,229 | 1/1951 | McLaren | 75—1 |
| 2,749,667 | 6/1956 | Hatch | 75—1 |
| 2,941,863 | 6/1960 | Wainer | 423—8 A X |
| 2,798,048 | 7/1957 | Magri et al. | 75—1 UX |

FOREIGN PATENTS

| | | | |
|---|---|---|---|
| 565,222 | 10/1958 | Canada | 75—1 |
| 723,087 | 12/1965 | Canada | 75—1 |
| 1,041,021 | 10/1958 | Germany | 75—1 |

ALLEN B. CURTIS, Primary Examiner

U.S. Cl. X.R.

423—84